US008058869B2

(12) United States Patent
Cranch et al.

(10) Patent No.: US 8,058,869 B2
(45) Date of Patent: Nov. 15, 2011

(54) FIBER LASER MAGNETIC FIELD SENSOR

(75) Inventors: Geoff A Cranch, Fairfax Station, VA (US); Gordon M. A. Flockhart, Kirkintilloch (GB)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 666 days.

(21) Appl. No.: 12/255,080

(22) Filed: Oct. 21, 2008

(65) Prior Publication Data

US 2009/0102474 A1   Apr. 23, 2009

Related U.S. Application Data

(60) Provisional application No. 60/981,539, filed on Oct. 22, 2007.

(51) Int. Cl.
*G01R 33/02* (2006.01)
(52) U.S. Cl. .............. 324/244.1; 324/245; 324/246; 359/280; 359/281; 359/282; 359/283; 359/284; 356/73.1; 356/35.5; 356/477; 356/480; 356/519; 73/800; 73/802
(58) Field of Classification Search .......... 359/280–284; 324/244.1, 245, 246; 356/73.1, 35.5, 477, 356/450, 480, 519; 73/800, 802
See application file for complete search history.

(56) References Cited

U.S. PATENT DOCUMENTS

| | | | | |
|---|---|---|---|---|
| 3,605,013 A | * | 9/1971 | Yoshikawa et al. | 324/96 |
| 3,666,351 A | * | 5/1972 | Pao | 359/298 |
| 4,102,579 A | * | 7/1978 | Stewart | 356/73.1 |
| 4,474,466 A | * | 10/1984 | McDonach et al. | 356/32 |
| 4,840,464 A | * | 6/1989 | Wilson | 359/281 |
| 4,850,098 A | * | 7/1989 | Yurek | 29/527.2 |
| 5,023,845 A | * | 6/1991 | Crane et al. | 73/800 |
| 5,038,103 A | * | 8/1991 | Scarzello et al. | 324/244.1 |
| 5,087,810 A | * | 2/1992 | Carome | 250/227.21 |
| 5,305,075 A | * | 4/1994 | Bucholtz et al. | 356/477 |
| 5,448,058 A | * | 9/1995 | Arab-Sadeghabadi et al. | 250/225 |
| 5,471,139 A | * | 11/1995 | Zadoff | 324/244.1 |
| 5,479,551 A | * | 12/1995 | DiGiovanni et al. | 385/123 |
| 5,488,475 A | * | 1/1996 | Friebele et al. | 356/478 |

(Continued)

OTHER PUBLICATIONS

P. Coghill et al., "A Passive High Sensitivity Magnetic Field Sensor Based on Metallic Glass Wire", Journal of Lightwave Technology, vol. 14, No. 8, Aug. 1996, pp. 1918-1925.*

(Continued)

*Primary Examiner* — Huy Q Phan
*Assistant Examiner* — Lamarr Brown
(74) *Attorney, Agent, or Firm* — Amy Ressing; Suresh Koshy (57) ABSTRACT

The device includes two supports and a primary conductive strip. The primary conductive strip includes a neutral surface, a first side, and a second side. The primary conductive strip is connected one of directly and indirectly on the first side to the two supports such that the primary conductive strip is constrained in two dimensions and movable in one dimension. The device also includes a primary distributed feedback fiber laser. The primary distributed feedback fiber laser includes a fiber axis. The primary distributed feedback fiber laser is connected to the primary conductive strip along one of the first side and the second side such that there is a positive distance between the neutral surface of the primary conductive strip and the fiber axis of the primary distributed feedback fiber laser.

18 Claims, 8 Drawing Sheets

U.S. PATENT DOCUMENTS

| | | | | |
|---|---|---|---|---|
| 6,366,075 | B1* | 4/2002 | Aitken et al. | 324/96 |
| 6,434,285 | B1* | 8/2002 | Blake et al. | 385/12 |
| 6,463,186 | B1* | 10/2002 | Li | 385/6 |
| 6,495,999 | B1* | 12/2002 | Beierl et al. | 324/96 |
| 6,542,244 | B1* | 4/2003 | Rumpf et al. | 356/477 |
| 6,630,819 | B2* | 10/2003 | Lanagan et al. | 324/76.36 |
| 6,812,696 | B2 | 11/2004 | Murphy | |
| 6,813,959 | B2* | 11/2004 | Kim et al. | 73/800 |
| 7,025,498 | B2* | 4/2006 | del Puerto | 374/44 |
| 7,277,162 | B2* | 10/2007 | Williams | 356/32 |
| 7,283,216 | B1* | 10/2007 | Geng et al. | 356/35.5 |
| 2002/0000804 | A1* | 1/2002 | Moriya et al. | 324/244.1 |
| 2004/0093950 | A1* | 5/2004 | Bohnert | 73/705 |
| 2010/0271623 | A1* | 10/2010 | Cranch et al. | 356/73.1 |

OTHER PUBLICATIONS

G.A. Cranch et al., "Cpmparative Analysis of the DFB fiber laser and fiber optic interferometric strain sensors", Third European Workshop on Optical Fiber Sensors, Jul. 5, 2007.*

A.Dandridge et al., "Optical Fibre Magnetic Field Sensors", Electronics Letters, May 22, 1980, vol. 16, No. 11, pp. 408-409.*

J. Jarzynski et al., Magnetic field sensitivity of an optical fiber with magnetostrictive jacket, Applied Optics, vol. 19, No. 22, Nov. 15, 1980, pp. 3746-3748.*

A. Yariv et al., "Proposal for detection of magnetic fields through magnetostrictive perturbation of optical fibers", Optics Letters, vol. 5, No. 3, Mar. 1980, pp. 87-89.*

K.P. Koo et al., "Characteristics of fiber-optic magnetic-field sensors employing metallic glasses", Optics Letters, vol. 7, No. 7, Jul. 1982, pp. 334-336.*

M. Sejka et al., "Distributed feedback Er 3+ -doped fibre laser", Electronics Letters, vol. 31, No. 17, Aug. 17, 1995, pp. 1445-1446.*

Giallorenzi et al., "Optical Fiber Sensor Technology", IEEE Journal of Quantum Electronics, vol. QE-18, No. 4, Apr. 1982, pp. 626-665.*

Okamura, H., "Fiber-Optic Magnetic Sensor Utilizing the Lorentzian Force" Journal of Lightwave Technology, vol. 8. No. 10, Oct. 1990.

Dagenais, D. M., Bucholtz, F., Koo, K. P., and Dandridge, A., "Demonstration of 3pT/(Hz) at 10 Hz in a Fibre-Optic Magnetometer", Electronics letters Nov. 10, 1988, vol. 24, No. 23.

Davis, A. R., Kirkendall, C. K., Dandridge, A., and Kersey, A. D., "64 Channel All Optical. Deployable Acoustic Array", Reprinted with permission from the 12th International Conference on Optical fiber Sensors, 1997 OSA Technical Digest Series, vol. 16, Optical Society of America.

Cranch, G. A., Crickmore, R., Kirkendall, C. K. Bautista, A., Daley, K., Motely, S., Salzano, J., Latchem, J. and Nash, P. J., "Acoustic Performance of a Large-Aperture, Seabed, Fiber-Optic Hydrophone Array", J. Acoust. Soc. Am, 115 (6), Jun. 2004.

Kersey, A., Jackson, D. A. and Corke, M., "Single-Mode Fibre-Optic Magnetometer With DC Bias Field Stabilization", Journal of Lightwave Technology, vol. LT-3, No. 4, Aug. 1985.

* cited by examiner

FIBER LASER MAGNETIC FIELD SENSOR

PRIORITY CLAIMS AND REFERENCE TO RELATED APPLICATIONS

This non-provisional patent application claims priority to U.S. Provisional Patent Application Ser. No. 60/981,539, filed 22 Oct. 2007, entitled "FIBER LASER MAGNETIC FIELD AND ELECTRIC CURRENT SENSORS," which provisional is incorporated herein by reference.

BACKGROUND OF THE INVENTION

1. Field of the Invention

This invention relates generally to a magnetic field sensor and more particularly to a magnetic field sensor that makes use of the Lorentz force.

2. Description of the Related Art

Fiber-optic interferometric sensors have become an established technology for Naval underwater acoustic applications. Both platform mounted systems and seabed mounted systems have been developed. See, e.g., Dandridge A., Tveten A. B., Kirkendall C. K. 2004 Development of the fiber optic wide aperture array: From initial development to production, *NRL Review* (available at www.nrl.navy.mil); Davis A. R., Kirkendall C. K., Dandridge A., Kersey A. D. 1997 64 channel all optical deployable acoustic array *Proc. of the 12th Int. Conf. Optical Fiber Sensors*, Washington D.C., 616-619; and Cranch G A, Crickmore R, Kirkendall C K, Bautista A, Daley K, Motley S, Salzano J, Latchem J and Nash P J 2004 Acoustic performance of a large-aperture, seabed, fiber-optic hydrophone array *Journal of the Acoustical Society of America* 115 2848-58, each publication incorporated herein by reference. Fiber-optic sensor based seabed mounted hydrophone arrays offer the potential for very large area coverage with a lightweight, rapidly deployable system. The optical fiber link is capable of carrying information from a large number of fiber-optic sensors (several hundred), to a remotely located shore station or surface mooring. Passive target detection by acoustic signature measurement forms the basis of many sonar systems. However, detection of targets by other associated signatures such as electric or magnetic field is also possible. See, e.g., Bucholtz F, Dagenais D M, Villarruel C A, Kirkendall C K, McVicker J A, Davis A R, Patrick S S, Koo K P, Wang G, Valo H, Eidem E J, Andersen A, Lund T, Gjessing R and Knudsen T 1995 Demonstration of a fiber optic array of 3-axis magnetometers for undersea application *IEEE Transactions on Magnetics* 31 3194-6, incorporated herein by reference. This can be particularly advantageous in areas of high acoustic reverberation and noise where acoustic detection ranges are limited. An underwater array consisting of a combination of sensors may therefore, in certain circumstances, provide an improved detection capability.

Fiber-optic sensor based magnetometers have many favorable attributes for applications requiring multi-point, remote measurements of low frequency magnetic fields. An undersea magnetometer requiring no electrical power is highly desirable to improve reliability and to enable remote location of the sensors. The sensors are connected by a fiber-optic link free from electromagnetic interference and do not radiate any electric or magnetic fields of their own. A fiber-optic magnetometer has been previously demonstrated that uses a magnetostrictive material to convert the magnetic field into a strain, which is measured interferometrically. See, e.g., Bucholtz F, Villarruel C A, Davis A R, Kirkendall C K, Dagenais D M, McVicker J A, Patrick S S, Koo K P, Wang G, Valo H, Lund T, Andersen A G, Gjessing R, Eidem E J and Knudsen T 1995 Multichannel fiberoptic magnetometer system for undersea measurements *Journal of Lightwave Technology* 13 1385-95, incorporated herein by reference. The magnetostrictive material was a transversely annealed Metglass cylinder around which optical fiber is wound. This is placed in one arm of an interferometer which measures the strain generated in the presence of a magnetic field. The response of the Metglass to magnetic field is quadratic, such that by applying an AC magnetic dither field to the transducer (typically up to 20 kHz) the low frequency magnetic field of interest appears as modulation sidebands on a carrier at the dither frequency. Low frequency magnetic field resolutions of 3 $pT/Hz^{1/2}$ at 10 Hz and 38 $pT/Hz^{1/2}$ at 0.1 Hz have been demonstrated, which compares very well to high performance flux-gate magnetometers achieving low frequency resolutions around 1-10 $pT/Hz^{1/2}$. See, e.g., Dagenais D M, Bucholtz F, Koo K P and Dandridge A 1988 Demonstration of 3 pt-square-root-(hz) at 10 hz in a fibre-optic magnetometer *Electronics Letters* 24 1422-3; Dagenais D M, Bucholtz F, Koo K P and Dandridge A 1989 Detection of low-frequency magnetic signals in a magnetostrictive fiber-optic sensor with suppressed residual signal *Journal of Lightwave Technology* 7 881-7; and Billingsley Magnetics, www.magnetometer.com, all publications incorporated herein by reference. However, magnetostrictive Metglass provides a far from ideal strain response. It has been observed that these materials can exhibit both a significant residual signal in the absence of a magnetic field, which can be equivalent to several µTesla as well as 1/f sideband noise associated with dynamic processes in the metglass. See, e.g., Dagenais D M and Bucholtz F 1994 Measurement and origin of magnetostrictive noise limitation in magnetic fiberoptic sensors *Optics Letters* 19 1699-701, incorporated herein by reference. Although methods based on choice of dither frequency and annealing conditions have been found to reduce these effects it is generally necessary to operate the sensor closed-loop, maintaining the magnetostrictive at its zero internal field point, to overcome hysteresis and the residual signal in the magnetostrictive. See, e.g., Kersey A D., Jackson D A., Corke M 1985 Single-mode fibre-optic magnetometer with DC bias field stabilization *J. Lightw. Technol.* LT-3 (4) 836-840, incorporated herein by reference. The fiber-optic interferometer must also be quadrature locked in order to achieve sub-µradian phase resolution. For a three axis magnetometer a total of four feedback loops are required resulting in a relatively complex sensor head when the associated electronics for the feedback loops are included. An array of eight three-axis magnetometers demonstrated magnetic field resolutions of 0.2 $nT/Hz^{1/2}$ at 0.1 Hz limited by residual 1/f noise. See, e.g., Bucholtz F, Villarruel C A, Davis A R, Kirkendall C K, Dagenais D M, McVicker J A, Patrick S S, Koo K P, Wang G, Valo H, Lund T, Andersen A G, Gjessing R, Eidem E J and Knudsen T. 1995 Multichannel fiberoptic magnetometer system for undersea measurements *Journal of Lightwave Technology* 13 1385-95, incorporated herein by reference. Although laboratory-based sensors have demonstrated significantly improved performance, consistent improvement in sensitivity has not yet been achieved. The need to provide electrical power and feedback signals to the sensor head is a significant disadvantage, particularly when the sensors are to be located several kilometers from the interrogation system.

An alternative transduction mechanism for a fiber-optic magnetometer has also been demonstrated previously, based on the Lorentzian force generated in a current carrying conductor in the presence of a magnetic field. See, e.g. Okamura H, 1990 Fiberoptic magnetic sensor utilizing the Lorentzian force *J. Lightw. Technol.* 8 (10), 1558-1564, incorporated herein by reference. A variant of this sensing concept uses a distributed feedback (DFB) fiber laser strain sensor to measure the strain induced in a vibrating metal beam carrying an AC dither current in the presence of a quasi-DC magnetic field. See, e.g. Cranch G A, Flockhart G M H, Kirkendall C K, 2006 DFB fiber laser magnetic field sensor based on the Lorentz force *Proc. 18th Int. Conf. Opt. Fib. Sensors,* OSA Tech. Digest, ISBN 1-55752-817-9, Cancun, Mexico and Cranch G A, Flockhart G M H, Kirkendall C K, 2008 Optically powered DFB fiber laser magnetometer, SPIE 7004, paper 7004-44, incorporated herein by reference. The DFB fiber laser strain sensor provides an order of magnitude increase in strain resolution compared with the remotely interrogated fiber-optic interferometer, for very short lengths of fiber. See, e.g., Cranch G A, Flockhart G M H, Kirkendall C K, 2007 Comparative Analysis of the DFB Fiber Laser and Fiber-Optic Interferometric Strain Sensors *3rd European Workshop on Optical Fiber Sensors,* Naples, Italy, 4-6 July, SPIE 6619, paper 66192C, incorporated herein by reference. This makes it ideally suited for this transduction mechanism where the interaction length is typically a few centimeters. Bending of the beam induces a flexural strain in the fiber in proportion to the Lorentzian force acting on the beam. This force is proportional to the product of the magnetic field strength and current, yielding an AC strain proportional in amplitude to the magnetic field. This transduction mechanism should yield no residual signal for zero applied field and is shown to exhibit no measurable hysteresis. Thus, it should be possible to achieve a stable, drift free magnetic field measurement with a sensor operating open loop. An added benefit is that the responsivity of the sensor is proportional to the current, thus an increase in current will yield a proportional increase in responsivity and sensitivity. The strain induced in the fiber laser modulates the laser emission frequency, which can be converted into an intensity modulation with an imbalanced fiber-optic interferometer located with the interrogation electronics. Thus, no feedback signal is required at the sensor head. The required dither current can be supplied optically removing the need to transmit electrical power to the sensor head.

SUMMARY OF THE INVENTION

An embodiment of the instant invention includes a device. The device includes two supports and a primary conductive strip. The primary conductive strip includes a neutral surface, a first side, and a second side. The primary conductive strip is connected one of directly and indirectly on the first side to the two supports such that the primary conductive strip is constrained in two dimensions and movable in one dimension. The device also includes a primary distributed feedback fiber laser. The primary distributed feedback fiber laser includes a fiber axis. The primary distributed feedback fiber laser is connected to the primary conductive strip along one of the first side and the second side such that there is a positive distance between the neutral surface of the primary conductive strip and the fiber axis of the primary distributed feedback fiber laser.

Optionally, the primary distributed feedback fiber laser includes a first distributed feedback fiber laser and a second distributed fiber laser. The first distributed fiber laser is attached to the first side of the primary conductive strip. The second distributed fiber laser is attached to the second side of the primary conductive strip such that the neutral surface resides in a geometrical center of the primary conductive strip.

Optionally, the device further includes a passive fiber, wherein the primary distributed feedback fiber laser is attached to the first side of the primary conductive strip. The passive fiber is attached to the second side of the primary conductive strip such that the neutral surface resides in a geometrical center of the primary conductive strip.

Optionally, the device further includes a passive fiber, wherein the distributed feedback fiber laser is attached to the second side of the primary conductive strip. The passive fiber is attached to the first side of the primary conductive strip such that the neutral surface resides in a geometrical center of the primary conductive strip.

Optionally, the device further includes a secondary conductive strip and a secondary distributed feedback fiber laser connected to the secondary conductive strip. The secondary conductive strip and the secondary distributed feedback fiber laser are placed adjacent to the primary conductive strip.

Optionally, the supports include one of plastic, glass, and non-ferrous metal.

Optionally, the primary conductive strip includes one of steel, titanium, copper, and aluminum.

Optionally, the primary conductive strip includes a conductive coating.

Optionally, the primary conductive strip includes a conductive core and a non-conducting coating.

Optionally, the primary distributed feedback fiber laser includes a rare-earth doped fiber, wherein a rare-earth dopant therefore includes one of erbium, erbium:ytterbium, praseodymium, and thulium.

Optionally, the device further includes an electrical current supply connected to the conductive strip for supplying electrical current one of optically and via a wire to said conductive strip.

Optionally, the device further includes an optical radiation source connected to the conductive strip for supplying electrical current to the conductive strip; and an optical to electric converter connected to the optical radiation source for generating the electrical current. Optionally, the optical to electric converter includes one of a Si photo-diode, a Ge photo-diode, and a InGaAs photo-diode. Optionally, the optical radiation source includes a laser, said laser comprising a wavelength, said wavelength being in a 400 nm-1100 nm range if said optical to electric converter comprises said Si photo-diode, said wavelength being in a 800 nm-1800 nm range if said optical to electric converter comprises said Ge photo-diode, said wavelength being in a 1000-1700 nm range if said optical to electric converter comprises said InGaAs photo-diode.

Optionally, the primary conductive strip is placed between flux concentrating materials. Optionally, the primary conductive strip includes a resonant frequency, the current including a current frequency matched to the resonant frequency of the primary conductive strip.

Optionally, the device further includes a secondary conductive strip; and a passive fiber connected to the secondary conductive strip. The secondary conductive strip and the passive fiber are placed adjacent to the primary conductive strip.

Another embodiment of the instant invention includes a device. The device includes two supports and a conductive strip comprising a neutral surface, a first side, and a second side. The conductive strip is connected one of directly and indirectly on the first side to the two supports such that the conductive strip is constrained in two dimensions and movable in one dimension. The device also includes a passive optical cavity strain sensor including a fiber axis. The strain sensor is connected to the primary conductive strip along one of the first side and the second side such that there is a positive distance between the neutral surface of the conductive strip and the fiber axis of the strain sensor.

DETAILED DESCRIPTION OF THE INVENTION

Figure 1A:
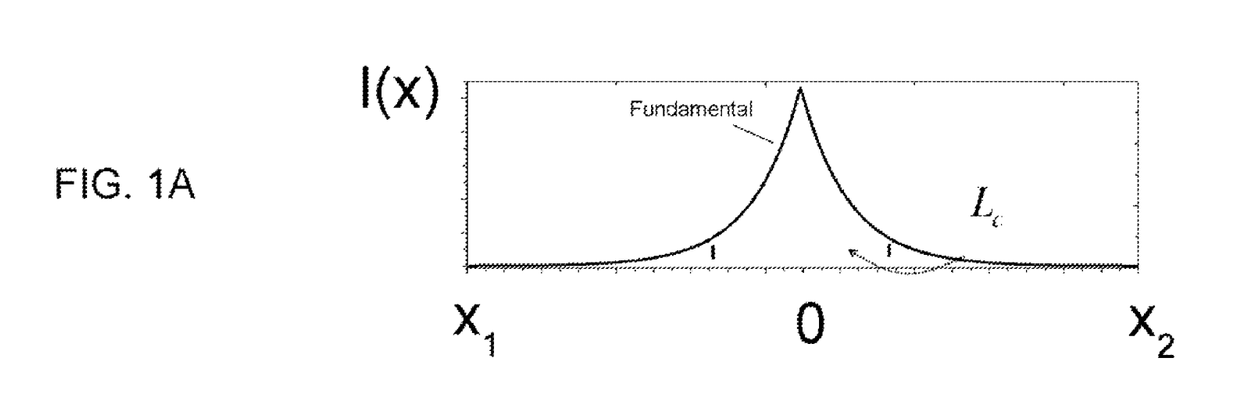
FIG. 1A is a graph of a longitudinal spatial mode profile of a fiber laser according to an embodiment of the instant invention.
Figure 1B:
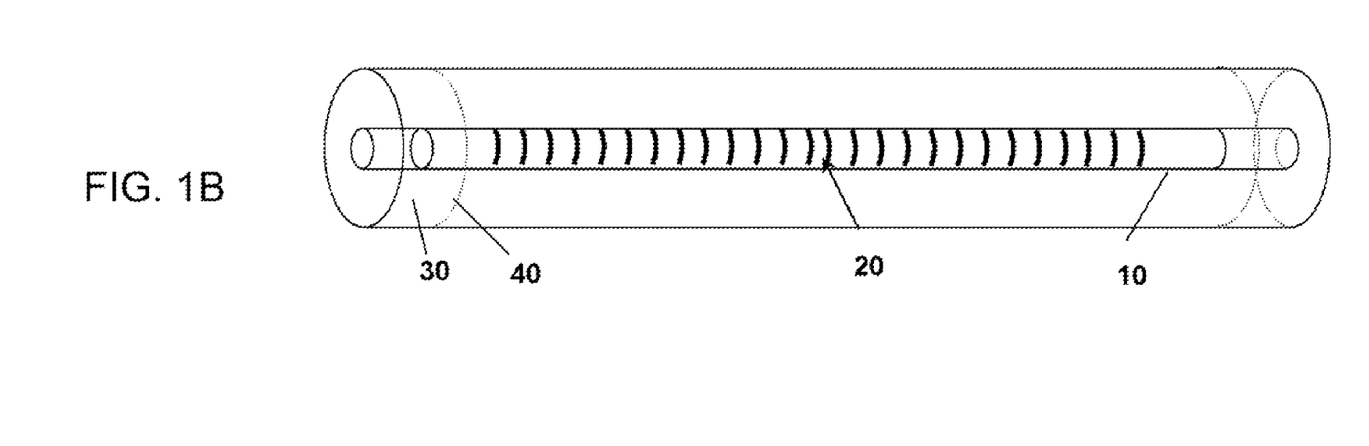
FIG. 1B is perspective view of a DFB fiber laser configuration according to an embodiment of the instant invention.

A DFB fiber laser configuration according to an embodiment of the invention is shown by way of example in FIGS. 1A and 1B. It consists, for example, of a length of single-mode, photosensitive erbium doped fiber (EDF) 10 within which a Bragg grating is formed. The distributed feedback structure is typically but not limited to a λ/4 configuration, formed with a single π phase-shift 20 in the grating. The phase shift is typically but not limited to placement in the center of the grating. The grating is formed, for example, by scanning a UV beam (e.g., 244 nm) across a phase-mask. Each end of the doped fiber is spliced to a passive fiber 30 (e.g., SMF-28™) at a splice location 40 and the erbium is pumped with a semiconductor laser at 980 nm. Laser emission wavelength is determined primarily by the pitch of the grating, Λ, according to the Bragg condition, λB=2nΛ, where n is the effective index of the optical fiber and can be set to within the erbium window (e.g., 1525-1560 mn). Slope efficiencies measured as the ratio of emission power to input pump power are typically less than 1% dependant on the gain characteristics of the erbium fiber and the grating properties. See, e.g., Foster S, 2004. Spatial mode structure of the distributed feedback fiber laser. IEEE Journal of Quantum Electronics 40 (7) 884-892, incorporated herein by reference. The laser structure supports a single fundamental mode, the center of which is located about the phase shift and thus emits a single frequency. The spatial mode intensity profile, I(x), is shown in FIG. 1A. For the ideal case of a uniform grating with a π phase-shift in the center, the mode intensity is described by I(x)=Io exp(−2κ|x|), where x is the axial coordinate along the fiber. The effective cavity length is Lc=1/κ, where κ is the amplitude of the coupling coefficient of the grating.

If a localized strain profile, described by Δε(x,t), is applied to the fiber, the normalized frequency shift is given by:

$$\frac{\Delta vs}{vs} = (0.78) \cdot \kappa \int_{x_1}^{x_2} \Delta \varepsilon(x, t) \cdot \exp(-2\kappa |x|) dx \quad (1)$$

The measurement resolution of the DFB fiber laser sensor is limited by the frequency noise of the emitted radiation. The spectral density of the frequency noise exhibits a $1/\sqrt{f}$ spectrum at frequencies below 1 kHz and is typically 40 Hz/√Hz at 100 Hz and 20 Hz/√Hz at 1 kHz.

Lorentzian Force-Based Sensor Model

Figure 2:
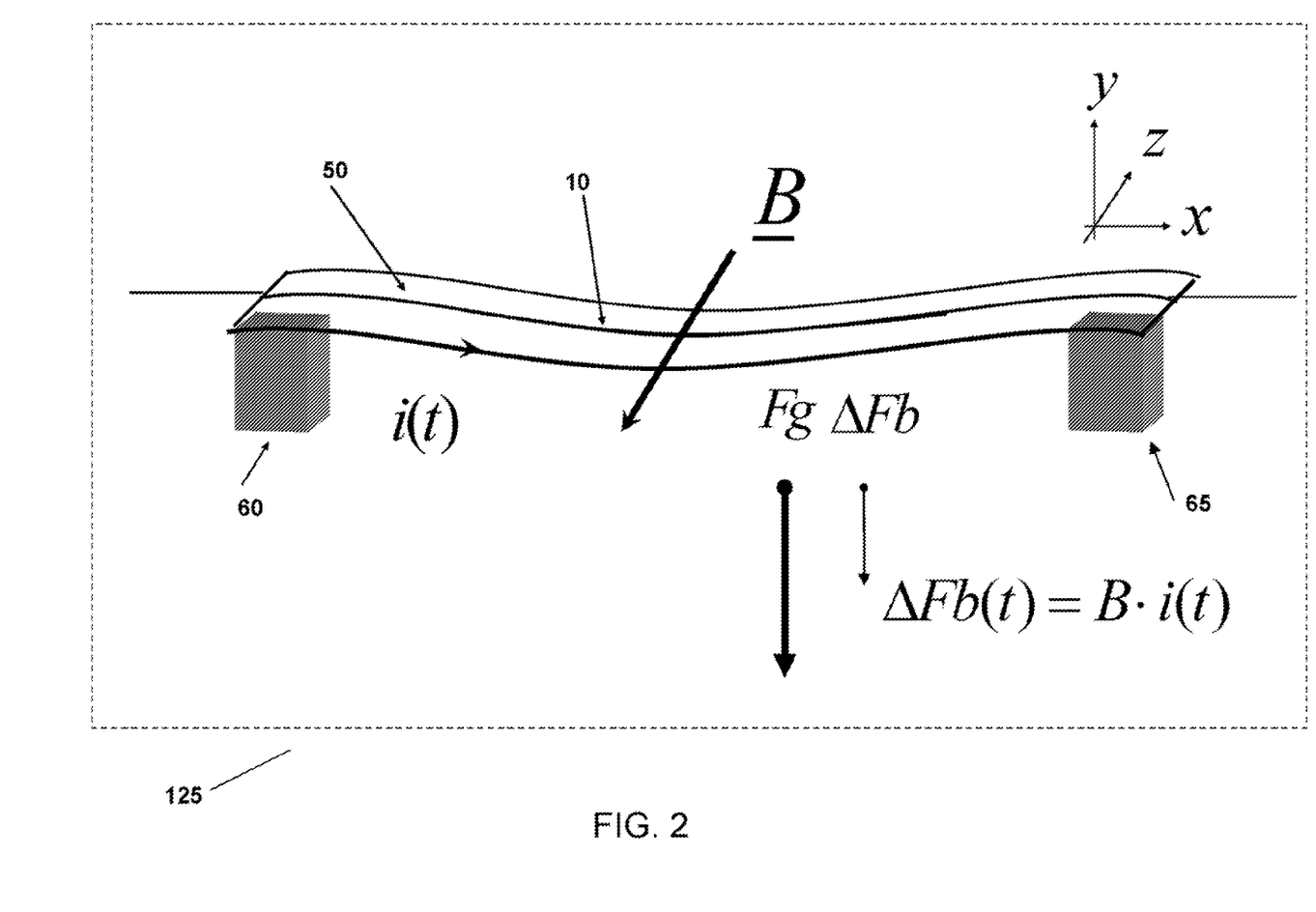
FIG. 2 is a perspective view of a Lorentzian force based magnetic field sensor configuration according to an embodiment of the instant invention.

A sensor in accordance with an embodiment of the invention includes a DFB fiber laser as described above and attached to a conducting metal strip 50, as shown by way of example in transducer 125 of FIG. 2. The DFB fiber laser and the conducting metal strip are connected at two supports 60, 65. Optionally, at least one of the supports is fixed. Optionally, at least one of the supports is movable in a direction along the axis of the DFB fiber laser. The DFB fiber laser is, for example, 50 mm in length with a centrally located π phase-shift. The phase shift is optionally positioned at any point along the beam and is typically positioned to be in the center of the beam, and the beam and fiber are, for example, clamped at each end. The coupling coefficient, κ, for the laser is, for example, ~200/m.

The responsivity of the sensor can be derived by considering the static and dynamic deflections of the beam under a uniform load.

Static and Dynamic Deflection Properties of the Beam

The deflection, y, of an elastic beam is related to the moments acting on the beam, M(x) through the flexure equation:

$$M(x) = E \cdot Iz \cdot \frac{d^2 x}{d y^2} \quad (2)$$

where E is the Young's modulus and Iz is the second moment of area of the beam. For a beam of length, l, fixed at each end subjected to a uniform load per unit length, F, under zero axial tension, the moments are given by:

$$M(x) = \frac{Fl}{2}x + \frac{Fl^2}{12} - Fx\left(\frac{x}{2}\right) \quad (3)$$

where the first term is a torque due to the reaction force at the edge of the beam, the second term is a torque due to the end constraint and the third term is a torque due to the uniform applied load, F. The x coordinate extends from zero to l. Substituting Equation (3) into Equation (2), integrating once and using the condition, (dy/dx)|(x=0)=0 for a fixed end boundary condition yields the beam tangent:

$$\theta(x) = \frac{F}{EI}\left(-\frac{1}{6}x^3 + \frac{l}{4}x^2 - \frac{l^3}{12}x\right) \quad (4)$$

The beam shape, y(x), can be obtained from a further integration of the beam tangent and applying the boundary condition, y(x=0)=0 yielding:

$$y(x) = \frac{F}{EI}\left(-\frac{1}{24}x^4 + \frac{l}{12}x^3 - \frac{l^2}{24}x^2\right) \quad (5)$$

Assuming that the beam is orientated with its flat face normal to the gravitational force, the applied load per unit length, F, comprises two components, Fg+ΔFb. Fg is the force due to gravity and ΔFb is the Lorentzian force, which for a current carrying conductor is equal to B·i, where B is the magnetic field induction (flux density) and is equal to μoH where H is the magnetic field strength and μo is the magnetic permeability. i is the current in the conducting strip.

The dynamic deflection of the beam can be calculated from the Euler equation for beams, by assuming simple harmonic motion for the driving force such that, $F=\eta\omega^2 y$ where η is the mass per unit length and ω is the excitation frequency. This yields:

$$\frac{d^4 y}{dx^4} - \beta^4 y = F \quad (6)$$

Here, the term $\beta=\eta\omega^2/EI$ has been introduced. The natural frequencies of vibration, ωn, for mode, n, can be obtained from:

$$\omega n = (\beta n \cdot E \cdot Iz/\eta)^{1/2} \quad (7)$$

where the constant, β1, is determined from the boundary conditions to be, $\beta 1=(16/3)\pi^4$, for the first resonance of a beam fixed at each end.

Calculating EI for the Composite Beam Structure

Figure 3:
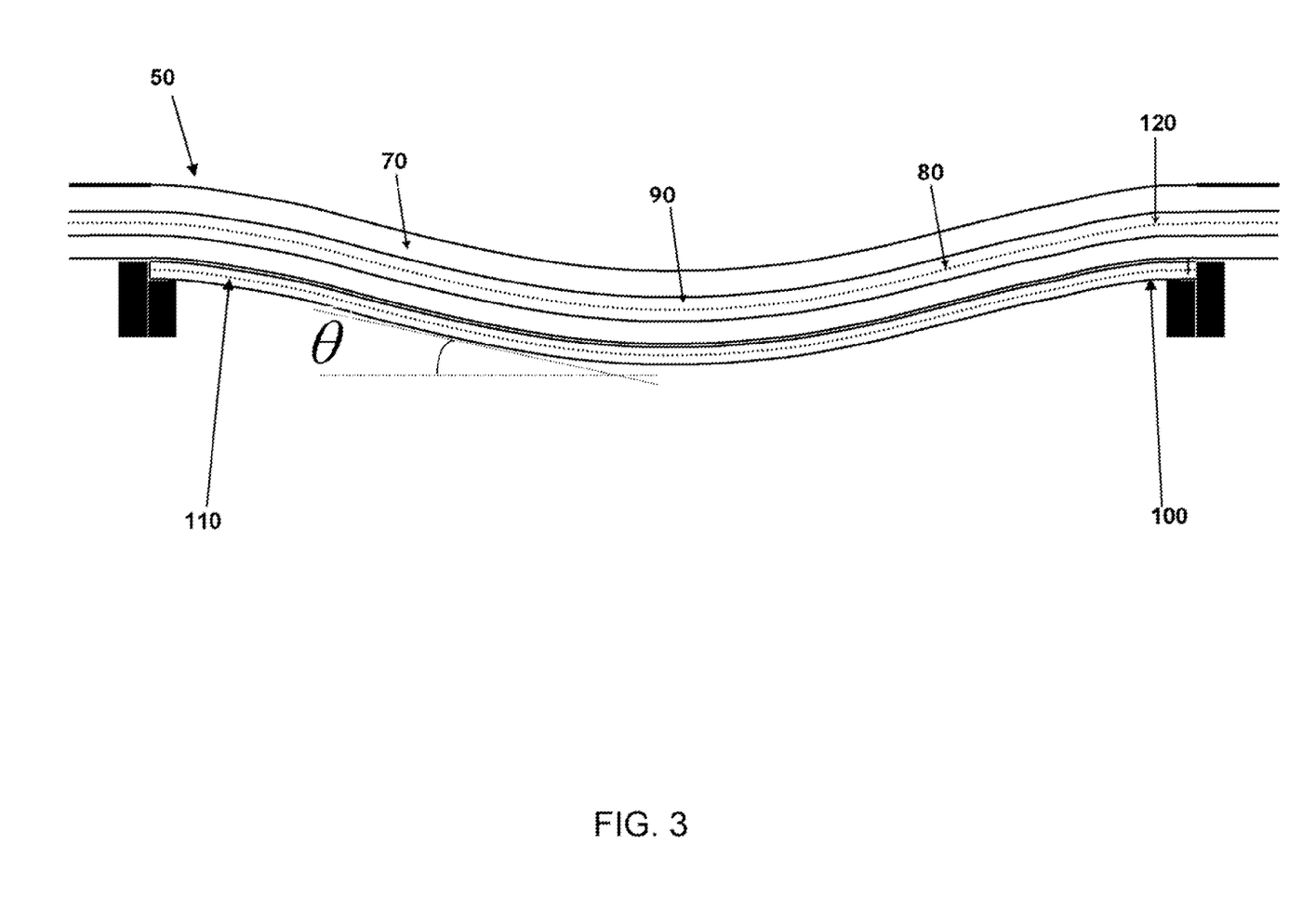
FIG. 3 is a cross-sectional view of a beam configuration according to an embodiment of the invention.

The beam, for example, includes a conducting metal strip 100 with the fiber laser attached to the surface, as illustrated in FIG. 3, and therefore must be treated as a composite structure. The conducting metal strip 100 includes a neutral surface 110. The beam 50 comprising a coating 70 adjacent to a core 80 having cladding 90 around it. The core 80 includes a fiber axis 120.

Figure 4A:
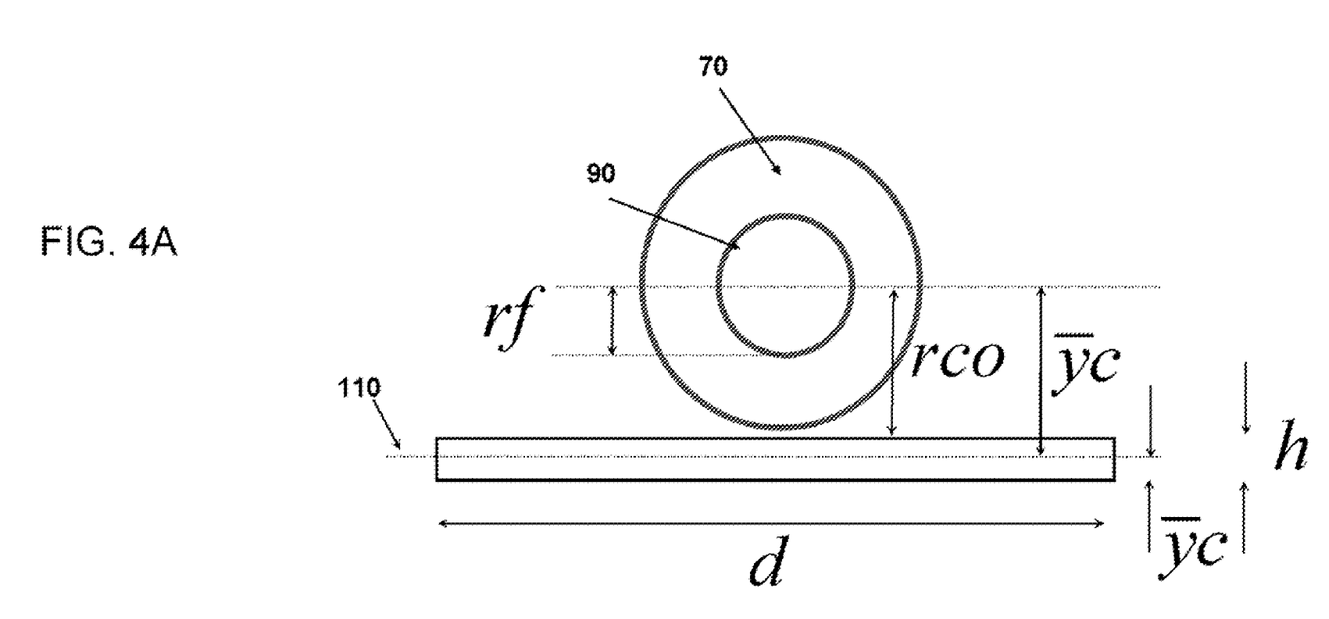
FIG. 4A is a cross-sectional view of composite beam according to an embodiment of the invention.

The displacements of this composite beam 50 can be determined by calculating effective values for the second moment of area, Iz_eff and Young's modulus, Eeff. The first step is to calculate the equivalent sections of the composite beam, which is a hypothetical structure exhibiting a uniform stress distribution. A cross-section of the beam 50 along the z axis is shown in FIG. 4A. If the Young's modulus of the beam 50, fiber 80 and coating 70 are given by, Eb', Ef and Eco then the radius of the equivalent section for the fiber is given by:

$$rf\_e = \sqrt{\frac{Ef}{Eb'}} rf \quad (8)$$

Figure 4B:
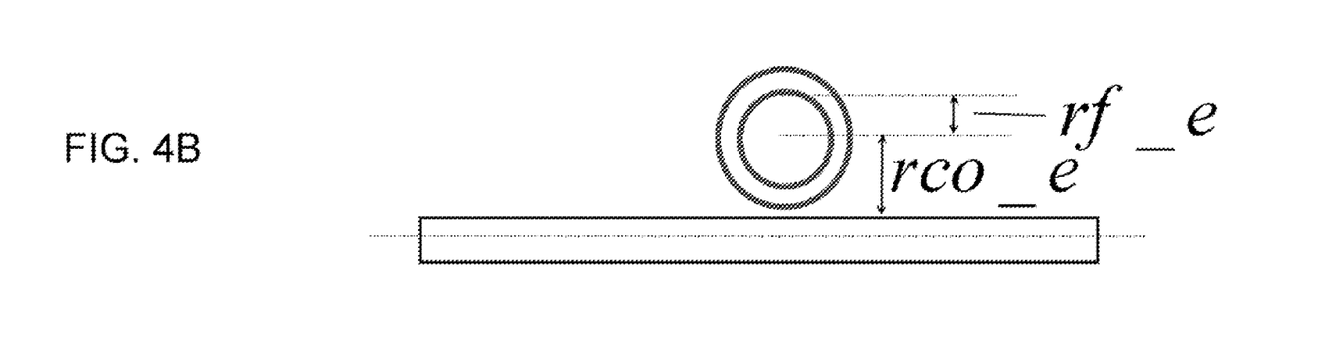
FIG. 4B is a cross-sectional view of an equivalent area of a beam cross-section according to an embodiment of the invention.

The conducting strip is considered to be a wide beam, and as such its stiffness is larger than that inferred by the Young's modulus of the material alone. This is accounted for by using the expression $Eb'=Eb/(1-\sigma b^2)$ in place of Eb, where σb is the Poisson ratio of the beam. The Young's modulus of the coating material is usually several orders of magnitude less than that of the beam or fiber resulting in rco_e≈rf_e and thus can be neglected. The neutral surface is determined by locating the centroid of the equivalent section, illustrated in FIG. 4B. The centroid is found by equating the product of the total area of the equivalent section and the distance to its centroid to the sum of the product of the areas of each layer and the distance to their centroid, where the distances are taken from a common reference point. Measuring from the bottom face of the beam, the position of the neutral surface is given by:

$$\bar{y}_c = \frac{d \cdot h^2/2 + (h + rf\_e) \cdot \pi \cdot rf\_e^2}{(dh + \pi \cdot rf\_e^2)} \quad (9)$$

The second moment of area of the structure is then calculated from the sum of the second moments of area of the beam and fiber about the neutral axis. The second moments of area of the fiber, Iz_f, and beam, Iz_b, about the neutral axis can be calculated using the parallel axis theorem to be:

$$Iz\_f = \frac{\pi \cdot rc^4}{4} + \pi \cdot rc^2 \cdot dn^2 \quad (10)$$

$$Iz\_b = (d \cdot h^3/12) + d \cdot h(\bar{y}c - h/2)^2$$

$$Iz\_eff = Iz\_f + Iz\_b$$

where $dn=rco+h-\bar{y}c$ is the distance from the neutral surface to the centre of the fiber. The Young's modulus of the composite beam is calculated using the rule of mixtures by area averaging the Young's modulus of the components of the beam.

Illustrative mechanical and physical properties for the beam and fiber are given in Table 1 below. Although values are given with respect the materials of steel and titanium. However, it should be understood that materials with similar conductive properties are acceptable. The Young's modulus of the composite structure is found to be very close to the Young's modulus of the beam since the beam exhibits the largest cross-sectional region of the cross-sectional area of the composite structure. The neutral surface lies close to the center of the metal beam. The second moment of area is determined primarily by the fiber since the fiber lies some distance away from the neutral surface and therefore causes significant stiffening of the structure. The effect of the mechanical properties of the beam on the product, Eeff.Iz_eff is illustrated by considering the parameters for titanium and steel beams. Using the material properties in Table 1 for titanium it is found that, Eeff=112 GPa, Iz_f=2.6×10⁸ μm⁴, Iz_b=3.0×10⁷ μm⁴, Iz_eff=2.9×10⁸ μm⁴ yielding Eeff.Iz_eff=3.3×10⁻⁵ Pa.m⁴. For steel, Eeff=175 GPa, Iz_f=2.6×10⁸ μm⁴, Iz_b=3.0×10⁷ μm⁴, Iz_eff=2.9×10⁸ μm⁴ yielding Eeff.Iz_eff=5.1×10⁻⁵ Pa·m⁴. The proportional difference in Young's modulus of the beams yield a similar difference in Eeff.Iz_eff.

TABLE 1

Parameters used in calculation

| Parameter | Value | |
|---|---|---|
| Fiber | | |
| Ef | 72 GPa | |
| Eco | 0.1 GPa | |
| ρf | 2200 kg·m⁻³ | |
| rf | 62.5 μm | |
| rco | 125 μm | |
| Beam | (Titanium) | (Steel) |
| Eb | 116 GPa | 193 GPa |
| Eb' | = Eb/(1-σb²) | |
| σb | 0.34 | 0.25 |
| ρb | 4500 kg/m³ | 7860 kg/m³ |
| h | 38 μm | 38 μm |

TABLE 1-continued

Parameters used in calculation

| Parameter | Value |
| --- | --- |
| d | 6.5 mm |
| l | 69 mm |

Sensor Responsivity

Bending of the composite beam will induce axial strain in the core of the optical fiber. For a beam clamped at both ends subjected to a uniform load, the neutral surface will experience elongation. However, the core of the optical fiber is some distance away from the neutral surface and experiences flexure strain which is significantly larger than this elongation (consequently, this effect is usually neglected in standard beam theory analysis). The flexural strain component can be analyzed as follows.

Flexural Strain

For the case of a linear elastic beam subjected to a load, any element of the beam not located in the neutral surface will experience longitudinal strain when the beam is bent. It is assumed that the beam is bent only with couples, such that there is no shear in transverse planes. This assumption applies in most practical cases when the beam thickness, h, is much less than the beam length, l. The local strain induced in a longitudinal plane, located a distance, dn, from the neutral surface is, $\Delta\epsilon(x) = \pm d_n K(x)$, where $K(x)$ is the curvature given by:

$$K(x) = \frac{d\theta/dx}{(1+\theta^2)^{3/2}} \approx \frac{d\theta}{dx} \quad (11)$$

The sign of the local strain indicates compression (−) or elongation (+), which depends on whether the fiber is located on the topside or underside of the beam. The magnitude of the local strain is then:

$$\Delta\epsilon_{fs}(z) = d_n \cdot (d\theta/dx) \quad (12)$$

The responsivity of the sensor is derived by substituting Equation (12) and Equation (4) into Equation (1) to yield, $$\frac{\Delta vs}{vs} = (0.78) \cdot \kappa \cdot d_n \cdot \frac{F}{EI} \int_0^l \left(-\frac{1}{2}x^2 + \frac{l}{2}x - \frac{l^2}{12}\right) \cdot \exp(-2\kappa|x - x\phi|) dx \quad (13)$$

where $x\phi$ is the position of the phase shift relative to the edge of the beam. The length of the grating is set to be equal to the supported length of the beam. The term in the integral evaluates to a constant dependent on the position and shape of the laser mode. If the beam is orientated such that its flat face is normal to the gravitational force, then the total force per unit length acting on the beam is the sum of the gravitation force, Fg, and the Lorentzian force, ΔFb. Injecting an AC current yields a time varying force such that, $\Delta F_b = B_i \cos(\omega_d t)$. The beam will vibrate at the AC frequency, $\omega_d$, and the strain measured by the laser becomes a tone at this frequency, the amplitude of which is proportional to the magnetic field, B. The component of the laser frequency modulation at the dither frequency, referred to as the Lorentz tone, is:

$$\frac{\Delta vs|_{\omega_d}}{vs} = (0.78) \cdot \kappa \cdot d_n \cdot \frac{\Delta F_b}{EI} \int_0^l \left(-\frac{1}{2}x^2 + \frac{l}{2}x - \frac{l^2}{12}\right) \cdot \exp(-2\kappa|x - x\phi|) dx \quad (14)$$

Figure 5:
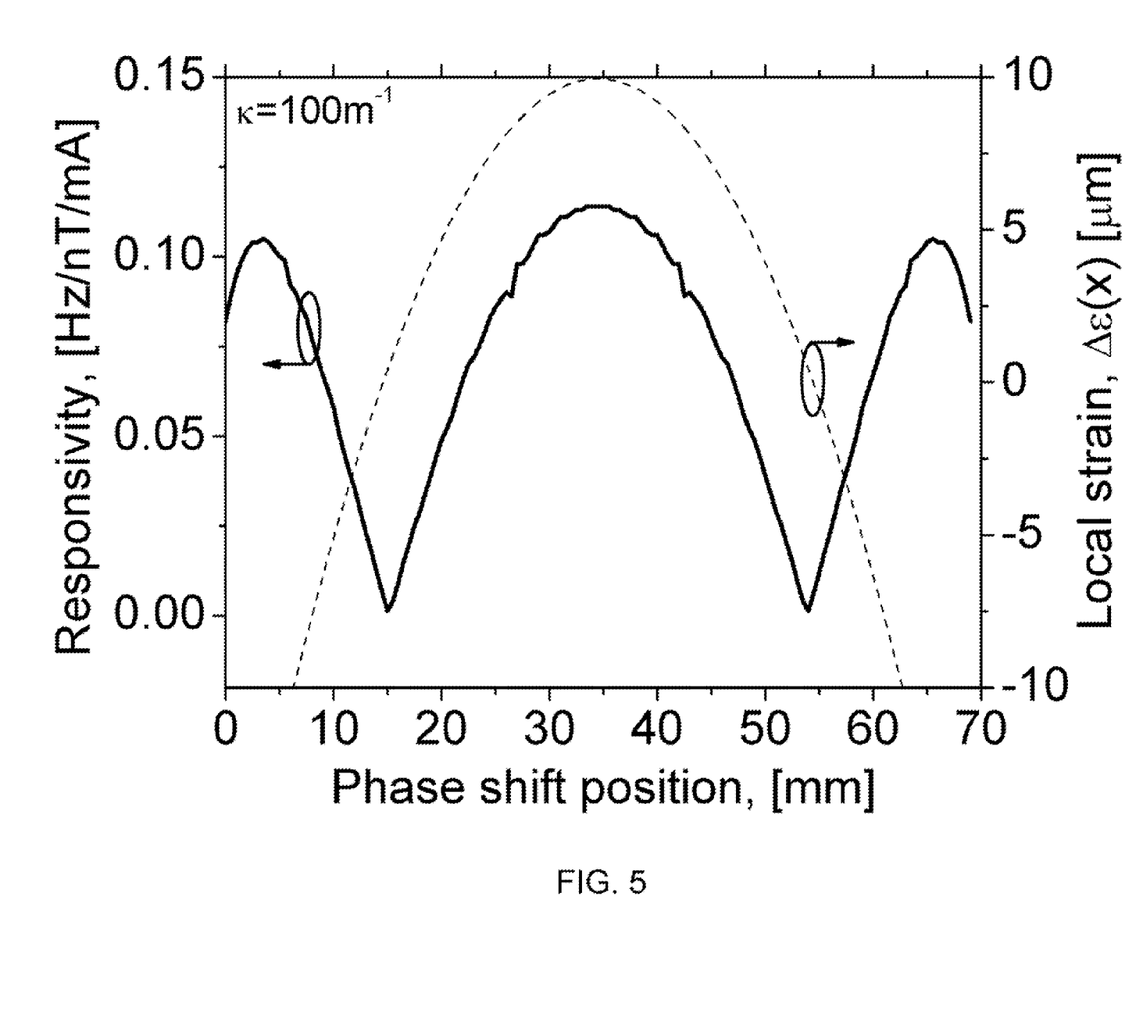
FIG. 5 is a graph showing local strain vs. position for a beam according to an embodiment of the instant invention under uniform load due to its weight and responsivity as a function of phase shift location for a titanium beam.

$\omega_d$ is set to coincide with the mechanical resonance, $\omega_n$, of the transducer, which provides a significant mechanical amplification of the responsivity. This also upconverts the magnetic field signal to a frequency above 1/f noise which limits the low-frequency strain resolution of the fiber laser sensor. For a composite beam under the load of its own weight, the induced local strain is shown in FIG. 5, using the parameters given in Table 1 for a titanium beam. The curvature is maximum in the center of the beam and changes sign approximately one quarter of the beam length from either end. FIG. 5 also shows the responsivity of the sensor due to flexure strain as a function of the position of the laser phase shift and hence laser spatial mode center. Here the relationship, $\Delta F_b = \Delta B \cdot i$, has been used to express the responsivity in units of Hz/nT/mA. The responsivity is maximum when the laser mode is located centrally on the beam and falls to a minimum at the point when the curvature crosses zero.

Equation (14) can be evaluated for the case of a centrally located phase shift ($x\phi = \frac{1}{2}$) which yields, $$\frac{1}{vs}\frac{\Delta vs}{\Delta B} = (0.78) \cdot \frac{d_n \cdot i}{24 \cdot \kappa^2 \cdot E_{\text{eff}} \cdot I_{z\_\text{eff}}} \{\exp(-\kappa l)[2\kappa^2 l^2 + 6\kappa L + 6] + \kappa^2 l^2 - 6\} \quad (15)$$

This can be simplified further to, $$\frac{1}{vs}\frac{\Delta vs}{\Delta B} = (0.78) \cdot \frac{d_n \cdot i}{24 \cdot \kappa^2 \cdot E_{\text{eff}} \cdot I_{z\_\text{eff}}} \{\kappa^2 \cdot l^2[2\exp(-\kappa l) + 1] - 6\} \quad (16)$$

which is accurate to within ~4% for $\kappa L \geq 4$. For the special case of an infinitely strong grating, (i.e. taking $\kappa \to \infty$), such that $\exp(-2\kappa|x - x_\phi|) = 1_{x=x_\phi}^{0\ x \neq x_\phi}$, Equation (16) reduces to, $$\frac{1}{vs}\frac{\Delta vs}{\Delta B} = (0.78)\frac{d_n \cdot l^2 \cdot i}{24 \cdot E_{\text{eff}} \cdot I_{z\_\text{eff}}} \quad (17)$$

which overestimates the responsivity by ~30%. Thus, the responsivity reduces to being proportional to the distance of the fiber from the neutral axis, the product Eeff.Iz_eff and the square of the length, l. However, dn is not an entirely free parameter, since it is related to the product, Eeff.Iz_eff. In general an increase in responsivity can only be obtained by increasing the device length, l, reducing the beam stiffness or increasing the current, i. Inspection of Equation (17) confirms that the responsivity of the transducer is independent of the physical orientation of the sensor, which is important to enable measurement of three components of a vector field.

The response of the composite beam to acceleration, Δa, can be determined by substituting the inertial force into Equation (13), given by Fa=η·Δa. This is important when considering its sensitivity to environmental vibration. The ratio of the beam response to magnetic field and the response to applied acceleration is then simply given by the ratio, i/η where η is the mass/unit length.

Effect of Grating Distortion on Laser Behavior

FIG. 5 shows the spatial dependence of the local strain induced in the fiber along the beam for a beam under the load of its own weight. This strain variation has the undesirable effect of changing the local Bragg period along the grating and can strongly affect the lasing behavior. Distortion of the grating will affect both the laser threshold and emission wavelength. To quantify this effect the behavior of a DFB laser comprising a uniform, π phase-shifted grating subjected to increasing beam deflection is modeled using the F-matrix. The FBG is described by the complex coupling coefficient, κ. The first step is to calculate the phase of the coupling coefficient as a function of the beam deflection. The local Bragg pitch of the grating, $\Delta\Lambda(x)$, due to a local strain, $\Delta\epsilon(x)$, is:

$$\Delta\Lambda(x) = 0.78 \cdot \Lambda b \cdot \Delta\epsilon(x) \quad (18)$$

where $\Lambda b$ is the grating pitch of the undistorted grating. The phase of the coupling coefficient is then given by, $$\arg(\kappa(x)) = \frac{2\pi}{\Lambda b} \int_0^x \left( \frac{\Lambda b}{\Lambda b + \Delta\Lambda(x')} - 1 \right) dx' \quad (19)$$

The peak deflection of a beam under zero tension is given by, $\Delta y_{max} = Fg \cdot l^4/(384 \cdot Eeff \cdot Iz\_eff)$ where Fg is the weight per unit length of the beam. Using the parameters given in table 1 for a steel beam, the peak beam deflection will be ~23 μm. The threshold is calculated in terms of the minimum fiber gain required for the laser to reach threshold and is plotted as a function of beam displacement in FIG. 6. For this simulation, a 50 mm long uniform grating ($|\kappa|=200/m$) with a centrally located π phase-shift, centered on the beam is assumed.

Figure 6:
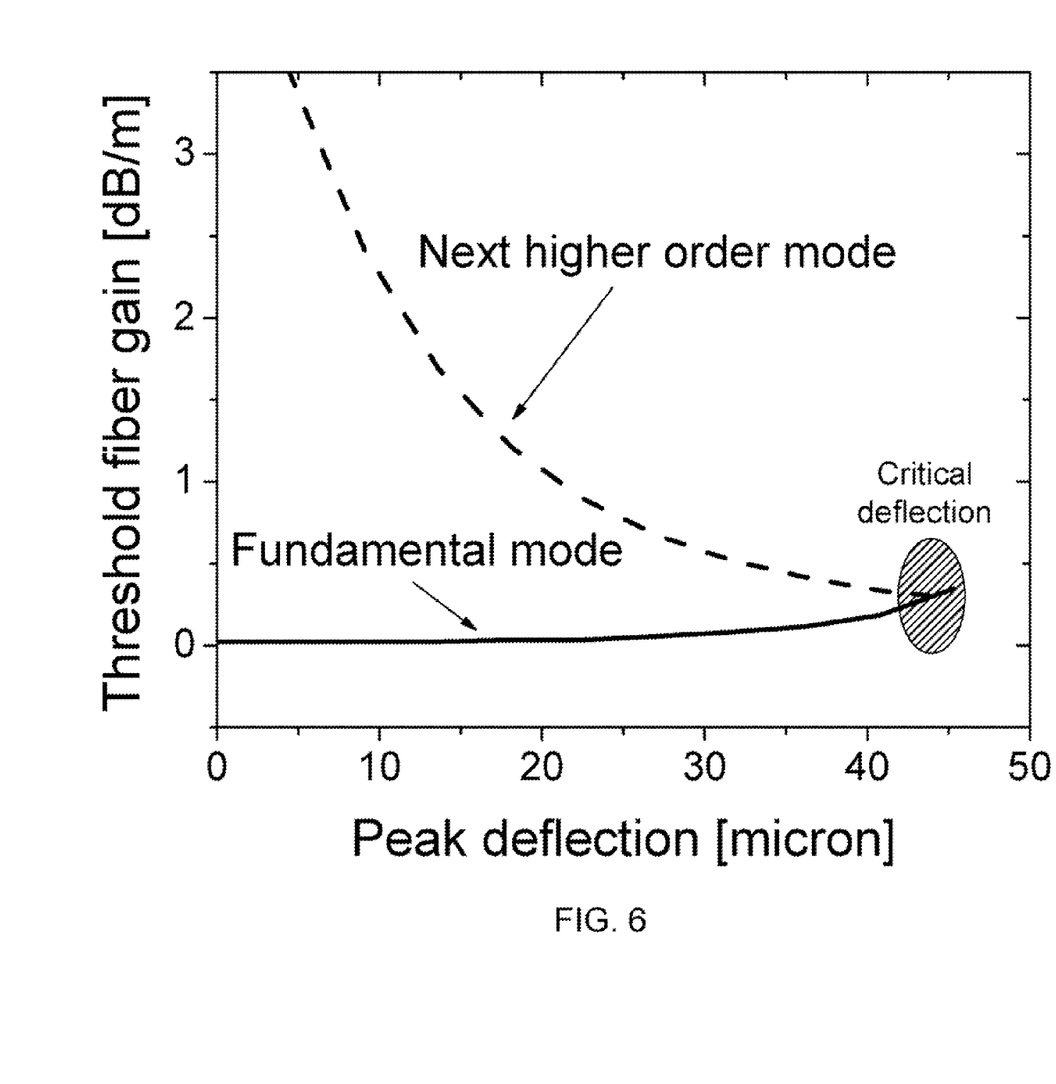
FIG. 6 is a graph showing dependence of laser thresholds on peak beam deflection for ideal phase-shifted grating.

When the peak beam displacement reaches a critical value of ~50 μm, the threshold of the fundamental and next higher order mode are equal. For higher beam deflections, the fundamental mode is no longer the lowest threshold mode. In practice, the grating is far from ideal and contains errors in the amplitude and phase of the coupling coefficient. These are caused during the writing process of the grating. Further localized distortion can be induced through nonuniformity of the coating and adhesive material when the beam is bent. These induced grating perturbations cause the fundamental mode threshold to increase and the higher order mode thresholds to be significantly reduced. Thus, in practice, the peak permitted beam deflection for the laser to operate in its fundamental mode is less that that predicted by the above analysis. To ensure that the fundamental mode is the lowest threshold mode, the beam deflection must be reduced, which can be achieved by applying an axial tension to the beam. This also has the effect of increasing the resonant frequency and reducing the responsivity of the sensor. Although the responsivity analysis presented above no longer accurately describes the sensor responsivity when a tension is applied to the beam, it will be shown that this added beam tension does not adversely affect the performance of the sensor other than reducing its responsivity.

Laser Sensor Setup

Figure 7:
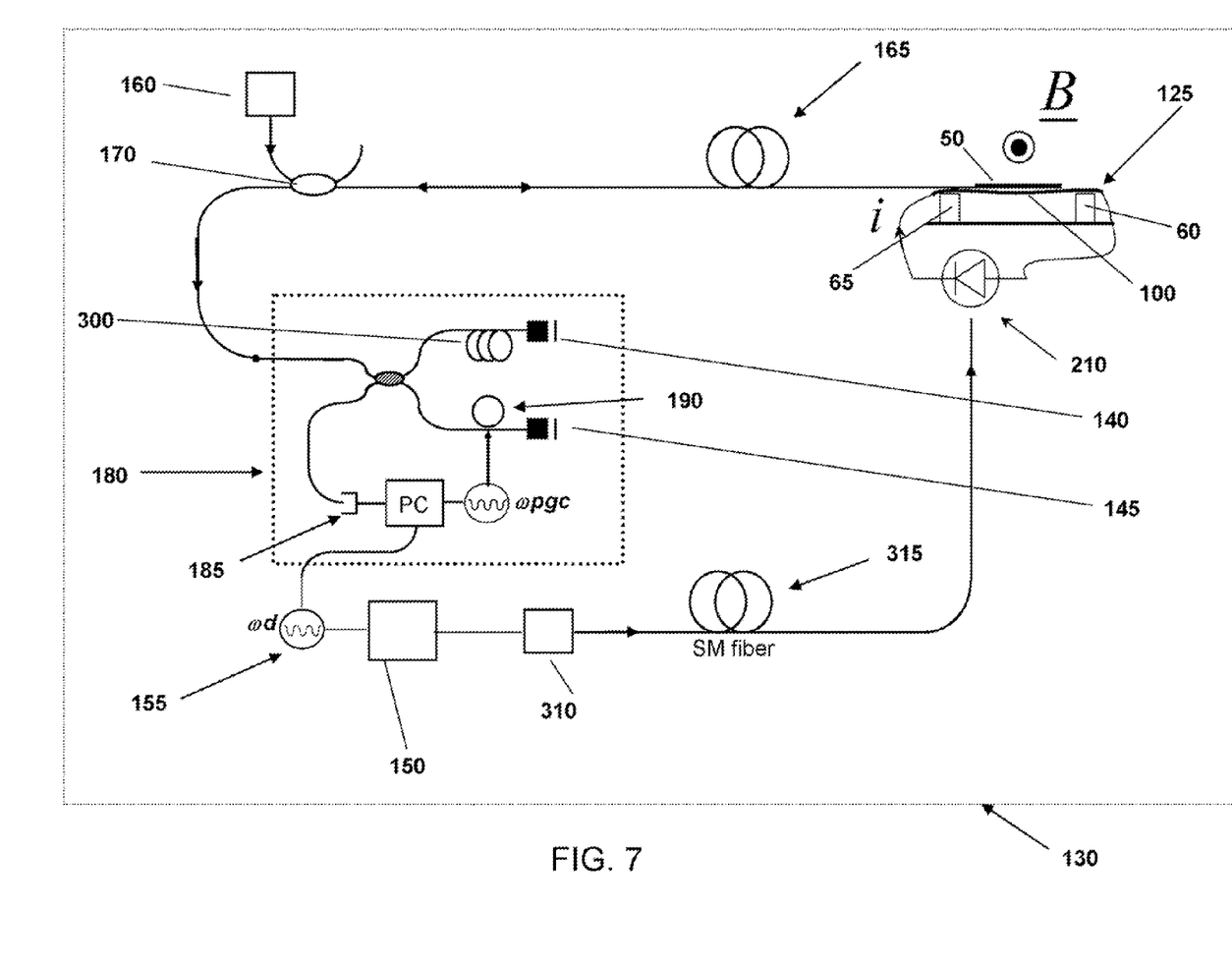
FIG. 7 is a schematic of a set-up for the fiber laser sensor according to an embodiment of the instant invention.

A fiber laser Lorentz force sensor (LFS) arrangement 130 according to an embodiment of the invention is shown by way of example in FIG. 7. FIG. 7 shows transducer 125 in the context of a system 130 used to interrogate the transducer. The transducer 125, for example, comprises a fiber laser attached to a conductive strip 100. The conductive strip 100 is, for example, a metal strip such as a steel strip. The fiber laser is pumped with radiation from a laser diode 160 which is coupled onto a fiber through a wavelength division multiplexer 170 and delivered to the laser through a first fiber 165. The signal from the fiber laser is transmitted through the same fiber, 165, to a fiber-optic interferometer 180, which converts the frequency modulation into an intensity modulation in the form of an interferometer signal detected with a photodiode, 185. An analog-to-digital converter and a personal computer (PC) are, for example, used to decode the interferometer signal. A dither signal is generated by a modulator 155, which modulates the current supply 150 for a second laser diode 310. The second laser diode 310 generates a second optical signal, which is delivered through a second fiber 315 to a large area photodiode 210, which generates a current to supply to the metal strip 100.

The fiber laser 50 comprises, for example, a 125 μm diameter cladding and a 400 μm acrylate coating. The fiber laser 50 is attached to the steel strip 100, for example, with a thin adhesive layer. The frequency of the AC dither current from the modulated current source 150 is set to correspond to the frequency to the mechanical resonance of the transducer 125 (typically 100-300 Hz). Illustrative dimensions of the steel beam 100 are 80 mm×6.5 mm×38 μm. the steel beam 100 is clamped between two supports 60, 65 where l is the length of the unsupported beam (69 mm). One support is, for example, adjustable to change the spacing between supports 60, 65 and hence the tension applied to the beam 100. The DFB fiber laser 50 is pumped, for example, with a 980 nm laser diode 160 through a wavelength division multiplexer (WDM) 170. The laser frequency modulation is demodulated using a readout interferometer 180 such as a Michelson interferometer (MI) with, for example, a 32 m fiber path imbalance 300 yielding a scale factor relating the interferometric phase to the laser frequency shift of, for example, 2 μrad/Hz. The ends of the fibers in the MI may be terminated with Faraday rotation mirrors 140, 145, which prevent polarization induced signal fading. A piezoelectric fiber stretcher, 190, may be incorporated on one arm of the interferometer to allow a phase modulation to be applied for demodulation purposes. Other interferometer configurations are optionally used to decode the laser frequency modulation such as a Mach-Zehnder or Fabry-Perot interferometer. When the transducer 125 is placed in a magnetic field which a component parallel to the plane of the beam and transverse to the fiber axis, the beam will experience the Lorentzian force and vibrate as illustrated in FIG. 2. This will modulate the laser frequency, which appears as a Lorentz tone in the interferometric phase. A phase-generated carrier demodulation method, for example, is used to decode the MI phase with its associated carrier frequency, $\omega_{pgc}/2\pi$, of 16 kHz applied to a piezo-electric stretcher in one interferometer arm. The interferometric fringe pattern is detected on a photodiode 185, the output of which is sampled with an analog-to-digital converter (e.g., National Instruments' PCI 6110 multi-function analog, digital, and timing I/O device). Photodiode 185 is, for example, a low noise InGaAs or Germanium photodiode. Analysis of the signals is performed, for example, on a personal computer (PC) using a signal processing software package such as National Instruments' LabVIEW™ Signal Processing Toolkit.

Photodiode 210 is, for example, a large area photodiode such as Si or Germanium or InGaAs capable of delivering sufficient current to the metal strip. The choice of detector is determined by the wavelength of the radiation from the laser diode, 310.

Demodulator

Figure 8:
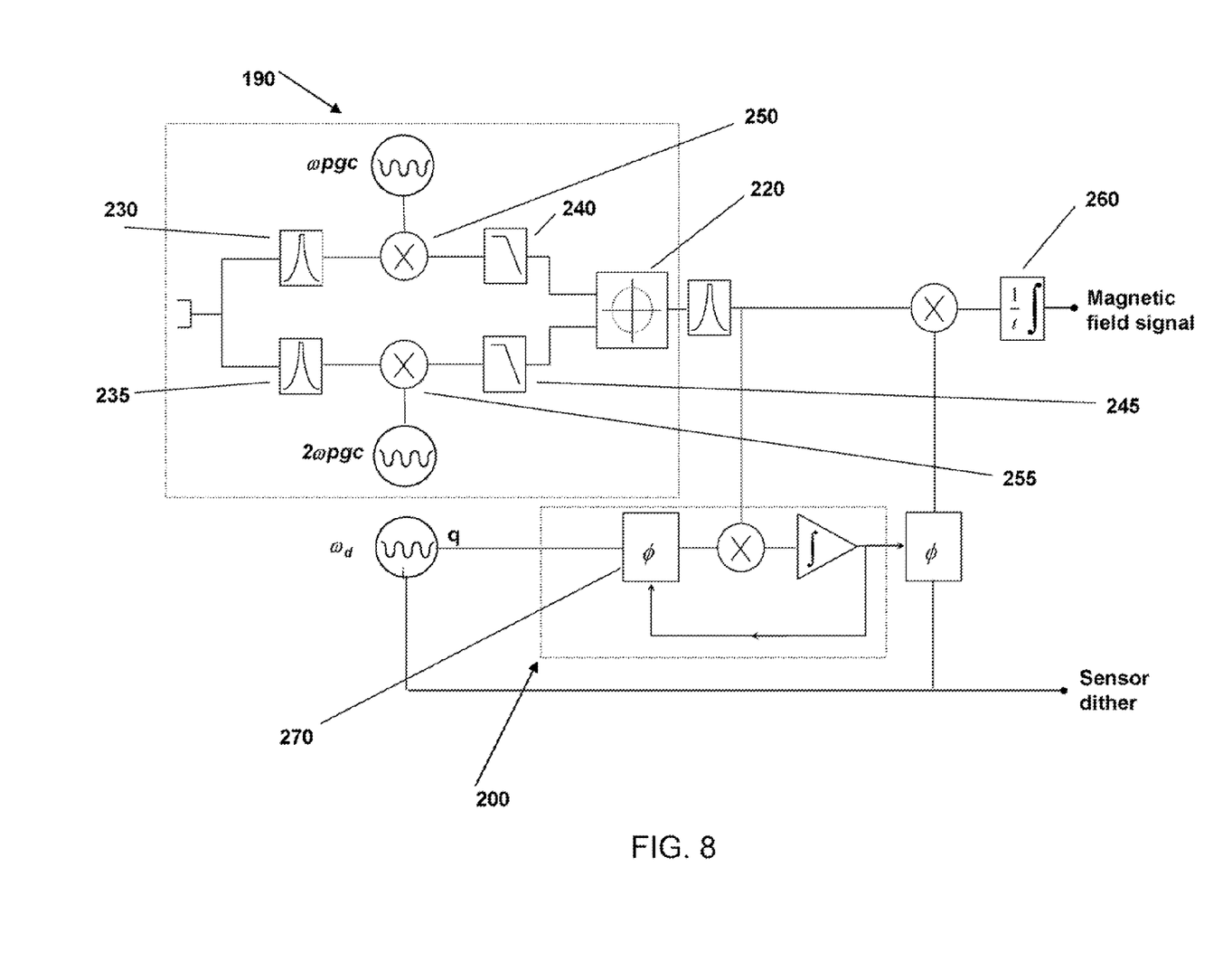
FIG. 8 is a schematic of a signal processing configuration for demodulating the interferometric signal according to an embodiment of the instant invention.

FIG. 8 shows a schematic of a phase-generated carrier (PGC) demodulator 190 for signal processing implemented in LabVIEW™. The sampled signal from the photodiode is separately bandpass filtered at ωpgc and 2ωpgc using bandpass filters 230, 235. The output of each filter 230, 235 is mixed with its corresponding reference frequency using mixers 250, 255 and the products are low pass filtered using low-pass filters 240, 245. This yields signals proportional to sin($\phi$mi) and cos($\phi$mi) where $\phi$mi is the interferometric phase of interest. An algorithm is then used to extract $\phi$mi modulo-$2\pi$ using the arctan function 220 and track fringe excursions beyond $2\pi$. This is necessary since temperature changes of the laser can cause rapid fringe cycling in the imbalanced Michelson interferometer. The amplitude of the Lorentz tone is tracked using synchronous detection of the phase of the MI with the dither signal, $\omega$d. To ensure that the two signals are phase matched, a feedback loop is used to lock the phase of the dither signal to the Lorentz tone. The Lorentz tone is first multiplied by the quadrature (q) version of the dither. The output is integrated, generating an error signal which is fed back to the phase shifter (PS) 270, which in turn adjusts the phase of the dither, locking it to the Lorentz tone in a phase-lock loop 200. This error signal is also used to shift the phase of the in-phase version of the dither, which is mixed with the interferometer phase signal. Finally, the output is time-averaged using an integrator 260 to obtain a signal proportional to the applied magnetic field. Small drifts in the phase of the Lorentz tone, which may occur due to thermal effects on the transducer, will be tracked by this feedback loop. Both the sensor dither and PGC carrier are generated in LabVIEW™ and output from a digital-to-analog converter (e.g., National Instrument's PCI 6110 multi-function analog, digital, and timing I/O device).

To optically power the sensor, the dither tone, $\omega_d$, drives a modulated current source close to 100% modulation depth, which provides the drive current for a second laser diode, such as a second 980 nm laser diode 310. The output of the laser diode is passed through optionally a single mode and multimode fiber and detected on a large-area photodiode (e.g., URS Corporation's EG&G SGD-100A photodiode having a responsivity of 0.29 A/W). The LFS strip is connected directly across the output of the photodiode. Since the total electrical resistance of the beam is very low (e.g., <few ohms), a typical photodiode is capable of supplying the current for several sensors. The pump diode output is, for example, 280 mW, which provides ~25 mA-rms at the dither frequency.

In an embodiment of the invention, transducer 125 includes a metal strip clamped between two supports. A fiber optic strain sensor, such as a fiber laser, is attached to a surface of the strip. The strip will vibrate in response to a driving force, such as that due to the Lorentzian force, when an AC current passes through the strip and the amplitude of the vibration is proportional to the current and magnetic field strength and independent of the gravitational force. Motion of the strip is confined to one dimension which is normal to the surface of the strip. The strip may be placed between flux concentrating materials that enhance the local flux density and hence increase the response to external magnetic field. Properties of such flux concentrating materials are well understood by those skilled in the art.

The many features and advantages of the invention are apparent from the detailed specification, and thus, it is intended by the appended claims to cover all such features and advantages of the invention which fall within the true scope and spirit of the invention. Further, because numerous modifications and variations will readily occur to those skilled in the art, it is not desired to limit the invention to the exact construction and operation as illustrated and described, and accordingly, all suitable modifications and equivalents may be resorted to, falling within the scope of the invention.

What is claimed is:

1. A device comprising:
   two supports;
   a primary conductive strip comprising a neutral surface, a first side, and a second side, said primary conductive strip being connected one of directly and indirectly on the first side to said two supports such that said primary conductive strip is constrained in two dimensions and movable in one dimension; and
   a primary distributed feedback fiber laser comprising a fiber axis, said primary distributed feedback fiber laser being connected to said primary conductive strip along one of said first side and said second side such that there is a positive distance between the neutral surface of said primary conductive strip and the fiber axis of said primary distributed feedback fiber laser.

2. The device according to claim 1, wherein said primary distributed feedback fiber laser comprises a first distributed feedback fiber laser and a second distributed fiber laser, said first distributed fiber laser being attached to said first side of said primary conductive strip, said second distributed fiber laser being attached to said second side of said primary conductive strip such that the neutral surface resides in a geometrical center of said primary conductive strip.

3. The device according to claim 1, further comprising a passive fiber, wherein said primary distributed feedback fiber laser is attached to the first side of said primary conductive strip, said passive fiber being attached to the second side of said primary conductive strip such that the neutral surface resides in a geometrical center of said primary conductive strip.

4. The device according to claim 1, further comprising a passive fiber, wherein said distributed feedback fiber laser being attached to the second side of said primary conductive strip, said passive fiber being attached to the first side of said primary conductive strip such that the neutral surface resides in a geometrical center of said primary conductive strip.

5. The device according to claim 1, further comprising:
   a secondary conductive strip; and
   a secondary distributed feedback fiber laser connected to said secondary conductive strip, said secondary conductive strip and said secondary distributed feedback fiber laser being placed adjacent to said primary conductive strip.

6. The device according to claim 1, wherein said supports comprise one of plastic, glass, and non-ferrous metal.

7. The device according to claim 1, wherein said primary conductive strip comprises one of steel, titanium, copper, and aluminum.

8. The device according to claim 1, wherein said primary conductive strip comprises a conductive coating.

9. The device according to claim 1, wherein said primary conductive strip comprises a conductive core and a non-conducting coating.

10. The device according to claim 1, wherein said primary distributed feedback fiber laser comprises a rare-earth doped fiber, wherein a rare-earth dopant therefore comprises one of erbium, erbium:ytterbium, praseodymium, and thulium.

11. The device according to claim 1, further comprising:
   an electrical current supply connected to said conductive strip for supplying electrical current one of optically and via a wire to said conductive strip.

12. The device according to claim 1, further comprising:
an optical radiation source connected to said conductive strip for supplying electrical current to said conductive strip; and
an optical to electric converter connected to said optical radiation source for generating the electrical current.

13. The device according to claim 12, wherein said optical to electric converter comprises one of a Si photo-diode, a Ge photo-diode, and an InGaAs photo-diode.

14. The device according to claim 13, wherein said optical radiation source comprises a laser, said laser comprising a wavelength, said wavelength being in a 400 nm-1100 nm range if said optical to electric converter comprises said Si photo-diode, said wavelength being in a 800 nm-1800 nm range if said optical to electric converter comprises said Ge photo-diode, said wavelength being in a 1000-1700 nm range if said optical to electric converter comprises said InGaAs photo-diode.

15. The device according to claim 1, wherein said primary conductive strip is placed between flux concentrating materials.

16. The device according to claim 11, wherein said primary conductive strip comprises a resonant frequency, the current comprising a current frequency matched to the resonant frequency of the primary conductive strip.

17. The device according to claim 1, further comprising:
a secondary conductive strip; and
a passive fiber connected to said secondary conductive strip, said secondary conductive strip and said passive fiber being placed adjacent to said primary conductive strip.

18. A device comprising:
two supports;
a conductive strip comprising a neutral surface, a first side, and a second side, said conductive strip being connected one of directly and indirectly on the first side to said two supports such that said conductive strip is constrained in two dimensions and movable in one dimension; and
a passive optical cavity strain sensor comprising a fiber axis, said strain sensor being connected to said primary conductive strip along one of said first side and said second side such that there is a positive distance between the neutral surface of said conductive strip and the fiber axis of said strain sensor.

* * * * *